(12) United States Patent
Yamaguchi

(10) Patent No.: US 6,249,551 B1
(45) Date of Patent: *Jun. 19, 2001

(54) VIDEO PLAYBACK METHOD AND SYSTEM FOR REDUCING ACCESS DELAY

(75) Inventor: Hirohisa Yamaguchi, Ibaraki (JP)

(73) Assignee: Texas Instruments Incorporated, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,906

(22) Filed: Dec. 19, 1996

(30) Foreign Application Priority Data

Dec. 25, 1995 (JP) .................................... 7-337134

(51) Int. Cl.[7] ...................................................... H04N 7/18
(52) U.S. Cl. ...................................................... 375/240.25
(58) Field of Search ..................................... 348/515, 472, 348/845.1, 845.2, 441, 419, 715, 719, 384, 416, 395; 386/75, 104; 360/19.1, 10.1; 375/240.25, 240.26

(56) References Cited

U.S. PATENT DOCUMENTS

| | | | | |
|---|---|---|---|---|
| 5,521,918 | * | 5/1996 | Kim ...................................... | 348/423 |
| 5,576,736 | * | 11/1996 | Miwa et al. .......................... | 358/426 |
| 5,617,502 | * | 4/1997 | Ort et al. .............................. | 386/96 |
| 5,664,044 | * | 9/1997 | Ware ..................................... | 386/75 |
| 5,734,862 | * | 3/1998 | Kulas ..................................... | 360/18 |
| 5,751,893 | * | 5/1998 | Shimoda et al. ..................... | 386/111 |

\* cited by examiner

Primary Examiner—Andy Rao
(74) Attorney, Agent, or Firm—Bret J. Petersen; Frederick J. Telecky, Jr.

(57) ABSTRACT

An MPEG video playback method and system that reduces delay at the time of video reproduction of an MPEG-compressed video signal. The invention discloses a video reproduction method in a video reproduction system containing an error-correction means, an MPEG decoding means, and buffers. In one embodiment, the signal held in the buffer is output as the video playback signal (block 6), and the output from the MPEG decoding means is output as a video playback signal (block 5). An embodiment of a method and system in which the buffer is arranged upstream to the MPEG decoding means is also disclosed.

7 Claims, 3 Drawing Sheets

VIDEO PLAYBACK METHOD AND SYSTEM FOR REDUCING ACCESS DELAY

FIELD OF THE INVENTION

My invention relates to video playback of compressed digital video signals, and more particularly to interactive video playback from an MPEG-compressed bitstream.

BACKGROUND OF THE INVENTION

MPEG is a series of software standards for digital video compression with good efficiency for a package type medium, such as for entertainment and educational software. In "interactive video playback," the user expects that the video playback is instantaneous from a compressed bitstream recorded, for example, on a CD-ROM. However, time is required for the read head to search for the target track, and unlike other media that record video in raw data format, such as a laser disk (using PCM recording by FM), video playback from a CD-ROM introduces certain unavoidable delays. This has become a key problem in using MPEG technology for real time entertainment and educational software.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

SUMMARY OF THE INVENTION

My invention analyzes the problem of this delay time from two aspects and offers a solution called interactive buffering (I-buffering). Generally, the delay in video playback relative to the time at which it was accessed includes the times required for the read head to move to the target track on the disk and for conducting error correction, and delays occurring because the decoding buffer of the MPEG decoder has filled the bitstream.

Because high speed video recording equipment requires high-density-storage media, such as CD-ROMs, complex error corrections must be performed at high speed. As a result, large scale data interleaving and error correction must be performed, increasing the processing time an order of magnitude. Also, MPEG decoding converts variable-rate input data into expanded, constant-rate output data. Thus, to enable a constant-rate output of decoded video signal, a large quantity of the MPEG-encoded signal should be pre-stored in a decoding buffer upstream of the MPEG decoder. To indicate the upstream buffer size, a parameter indicating the VBV-buffer size can be encoded in the data bitstream.

In a first embodiment of my video playback method (post-buffering), first, by means of a first access, a video playback signal is output based on a signal held in a special buffer called an I-buffer. Then, by means of a second access, the video playback signal from the MPEG decoding means is consecutively output. Also, in a second embodiment (pre-buffering), by means of a first access, a signal held in the I-buffer is output as a video playback signal by decoding at the MPEG decoding means, and by means of a second access, a portion of signal that has not been held by the I-buffer is connected at the MPEG decoding means, and output as an decoded consecutive video playback signal.

In a separate configuration of my invention, a video playback system is offered that uses pre-buffering.

In the figures, 1 are head seek steps, 2 buffering steps for the error correction buffer, 3 error correction steps, 4 buffering steps at the decoding buffer, 5 decoder steps, 6 steps for output from an I-post buffer, 7 steps for output from the I-pre-buffer, and 9 are switching steps

DETAILED DESCRIPTION

The fastest CD-ROM drive device available on the market today achieves a track seek time of 145 msec (average), but ordinary CD-ROM drives have a longer seek time, as much as 200 to 360 msec. My invention can be used with a high density CD-ROM recently developed for storing 4 Mbps MPEG-2 video. This CD-ROM is for use in a high fidelity audiovisual sing-along (karaoke) player, and its basic hardware specifications are shown in Table I.

TABLE I

| Technical specifications | Data |
| --- | --- |
| Data bit rate | 4.714 Mbps |
| Track pitch | 1.0 μm |
| Linear velocity | 2.34 m/sec |
| Playback time | 60 min |
| Modulation | (1.7) RLL coding |
| Recording bit rate | Before modulation 6.81 Mbps |
|  | After modulation 10.2 Mbps |
| Error correction code | 3-dimensional Reed-Solomon |
| Error correcting block | User data is 65536 bytes |
| Data error rate | $<10^{12}$ |
| User data available per side | 2. IGByte |
| Logical data format | ISO9660 |

In the case of this disk, to introduce the 3-dimensional Reed-Solomon code, a data buffering of (59, 50, 30)=88.5 KB is necessary. This corresponds to a buffer time of 150.2 msec.

From the technical data of this table, it can be seen that when the read head moves to a different track, if it can be assumed that the tracking head moves to the target track in a negligibly short time compared to the disk rotating velocity, this requires a track access time as long as 156 msec (maximum). Usually, head seek time takes from 200 to 400 msec.

To achieve the required low data error rate, the disk drive device uses an error correction system, and the system that uses the 3-dimensional Reed-Solomon code is one of those systems.

In one example of an error correction structure based on the 3-dimensional Reed-Solomon code, 65,536 bytes of user data, 220 bytes of subcode, 16 bytes of block address, and 4 bytes for CRC check bytes are arranged in a 3-dimensional matrix with dimensions (X, Y, Z)=(55, 46, 26), and after that, a 4 byte check sum symbol is added to each axis of the 3 directions by means of the Reed-Solomon code. This error correction structure is said to be extremely effective in suppressing an increase of redundancy, and improves the recovery (resiliency) for random and burst errors for the encoded video/voice/data information. The data error rate of $10^{-12}$ corresponds to only one bit error in 70 hours of continuous video playback.

Figure 1:
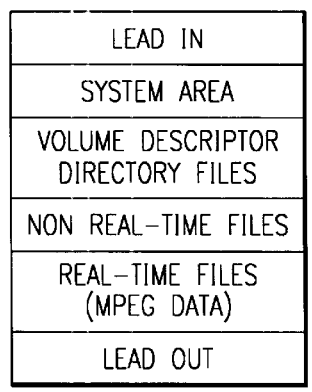
FIG. 1 is diagram of the file structure of a one-volume CD-ROM.

In the ISO9660 CD-ROM specifications, a whole disk is defined as a volume. A volume has the structure shown in FIG. 1. Files are divided into real-time files and non-real-time files. The non-real-time files hold information related to the contents of the real-time files. One index key for the real-time files is the track and sector position of each video/sound/data sequence. The position is a unit to access, for example a complete single song sequence in karaoke, or a game sequence. A sequence may comprise one or more video segments. The real-time files store the video, voice, and general data according to the MPEG systems/layer format. Because MPEG Systems Layer bitstreams are always byte-aligned, each independent video/voice segment can be aligned on a sector boundary.

Figure 3:
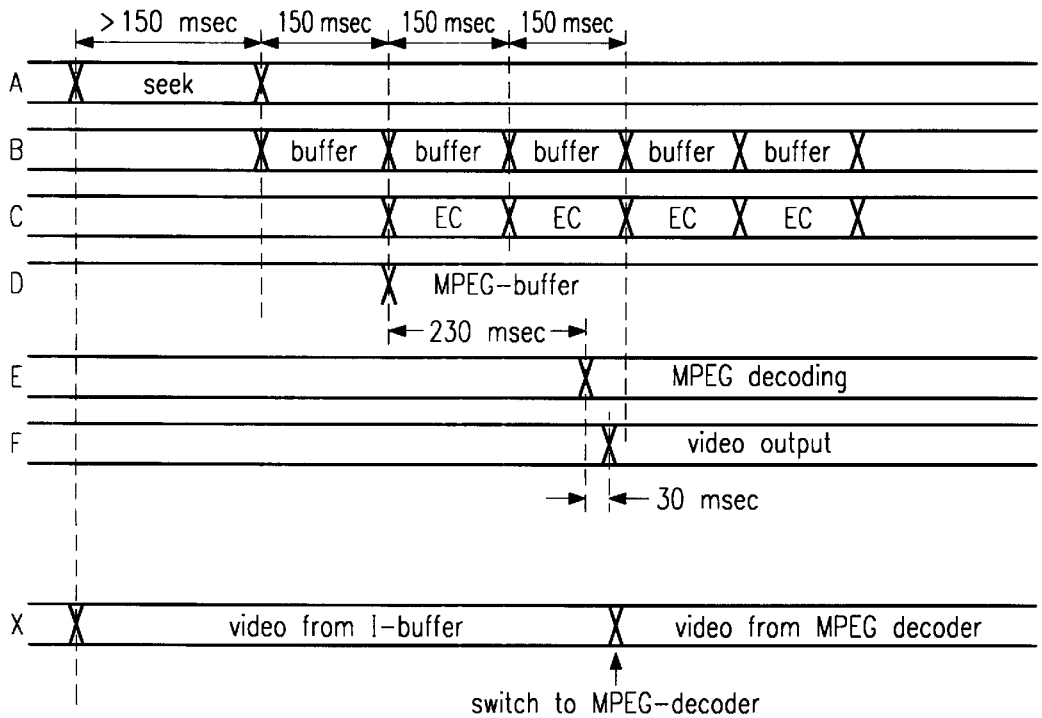
FIG. 3 is timing diagram of the embodiment of FIG. 2.

Various delays are present in video reproduction from the CD-ROM, but just for error correction, about 88.5 KB of data buffering is required, corresponding to approximately 150 msec are required in its buffering as shown in FIG. 3.

Even assuming that the error correction is almost instantaneous compared to 150 msec, for MPEG it is necessary that that resultant bitstream be stored in a decoding buffer until the stored bit volume exceeds the VBV buffer size. This buffer size determines the delay time before the MPEG decoder starts the decoding.

In MPEG, the collected units of the image that are made up of multiple frames are called GOP, but assuming that 30% of these GOP bits are used in I-image encoding and that the size of the buffer is set at 25% larger than this bit number, the bit volume stored beforehand is 2,031,280 bits/GOP× 0.3×1.25=761 KB. In the first buffer required for error correction, only 491 KB the total of 708 KB are used for video decoding. Thus, the VBV buffering for the decoder buffer takes as much as 230 msec.

The decoded video then exits the MPEG decoder after another 30 msec.

When all of the delays are totaled, it can be seen that the video reproduction takes at least 150 msec(seek time)+150 msec (error correction buffering)+230 msec(decoding buffering)+30 msec(decoding)=660 msec. The performance of an actual CD-ROM drive is probably slower than this because the seek time is another order of magnitude longer.

Such delay can be a serious problem, especially for interactive games using MPEG compression video (for example, games involving shooting, driving, and real-time adventures).

There are two methods for solving this problem. One solution is to pre-decode the delayed portion of the video and store it in a post-decoder buffer. When this specific video sequence is accessed, the decoded video stored in the post-decoder buffer is first immediately displayed, and then the video is switched to synchronize with the output of an MPEG decoder that starts video reproduction from a bitstream read from an advanced position on the CD-ROM. This form of buffering is called I-post-buffering, and another buffering solution is called I-pre-buffering.

A first embodiment of my invention will be explained with reference to FIGS. 2 to 8.

(1) I-Post-Buffering

Figure 2:
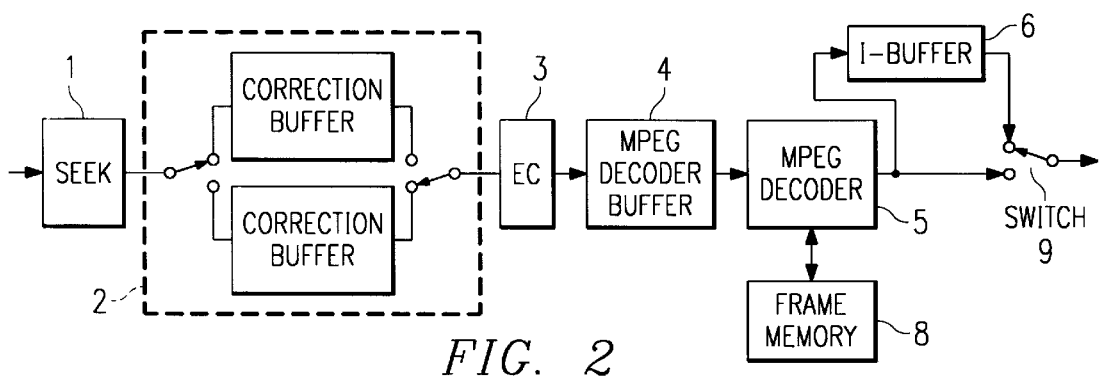
FIG. 2 is block diagram of a first embodiment of my invention.

My method and system for I-post-buffering are illustrated in the functional block diagram of FIG. 2 and timing chart of FIG. 3. After a head seek for a target track on the CD-ROM disk is conducted (block 1), an image signal bitstream from the target track is buffered in an error correction buffer (block 2), and then error correction (EC) is conducted (block 3). The error-corrected bitstream is buffered in an MPEG decoding buffer, (block 4), and then decoded at the MPEG decoder (block 5). Conventionally only this decoded video stream is output as a video signal (timing diagram A-F of FIG. 3), but in this embodiment, first a pre-decoded video buffered beforehand in an I-post-buffer is output as an initial video signal by accessing the I-post-buffer (block 6). At a predetermined time (a second access time after the prescribed 660 msec delay time has elapsed), a switch is made to the video output of the MPEG decoder (block 9). After that the MPEG decoder converts buffered video stream input into a video signal (timing diagram X).

The maximum size of the buffer used for MPEG decoding is recorded in front of the bitstream as the VBV buffer capacity. What is called the VBV buffer capacity is the storage volume in bits that become necessary prior to the MPEG video decoding. After the correct track is found on the CD-ROM disk, the maximum delay until the video comes out from the MPEG decoders can be easily estimated by means of calculating from the VBV buffer volume.

This estimated value determines the length (frame count) of the necessary video as well as voice decoded beforehand and stored in the I-post-buffer. This video segment can be expanded to cover the track seek time.

Within the video, the section that should be stored in the I-post-buffer must be a completely decoded I-image format. Even if compression is used to a certain extent, the decoding must be instantaneous as in the DPCM within the frame/field.

For example, in the case of interactive use of a CD-ROM in an entertainment game, multiple video reproduction input points are present at each game section. That selection is extremely difficult to predict, nevertheless when the selection is made, it must be instantaneous. This means that to the extent possible, all of the video reproduction segments must be stored beforehand in the buffer.

Figure 6A:
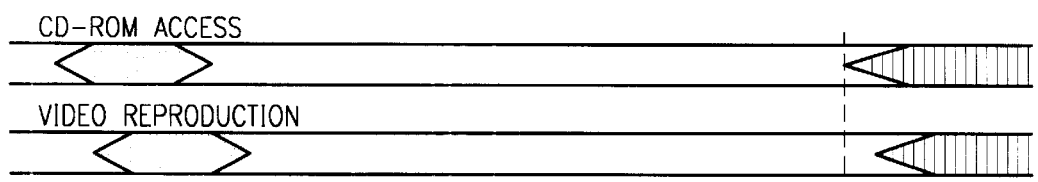
FIGS. 6A and 6B illustrate the filling method for the buffers in my invention.
Figure 6B:
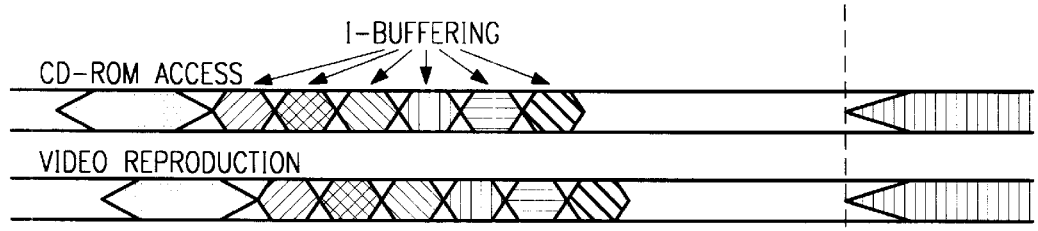

FIGS. 6A and 6B show how the I-post-buffer is filled. These figures first show how a not-yet-active I-post-buffer is filled, and how the video from the second access is used to be shown interactively. The I-post-buffer can operate from the very beginning, and the fact is understood that video can be consecutively played back from the access point.

The usual access for a CD-ROM is fairly intermittent as is shown in FIG. 6A. In other words, since there is a proportionately long rest period in which the CD-ROM is not accessed at all, as is shown in FIG. 6B, during this period, the I-post-buffer can be filled. This Figure shows the case wherein the video for the next six start segments (the initial bitstream portion of the video segment) are stored. These videos are decoded immediately after the current video reproduction is completed, but are not displayed. Instead, these are written into the I-post-buffer. However, when one of the six new video segments is accessed, the video is initially displayed from the I-post buffer and then switched to the output from the MPEG decoder decoding video from a slightly advanced position.

On the other hand, when access is conducted in the interval that I-post-buffering is advancing or is not yet completed, the buffering is stopped, and the video is required to be accessed by the ordinary method. Thus, the effectiveness of I-post-buffering is somewhat related to the length of the drive access rest period, but in actuality this is a fairly long period of time, and one reason for this is that usually large graphic (CG) images are substituted between the video play backs.

It is necessary that an I-post-buffer control (not shown in the fig.) access the non-real-time file (FIG. 1) to know the locations of the bitstream corresponding to each video playback. After the output video is stored in the I-post-buffer, the MPEG decoder advances to the track position necessary for actual access, and the video output from the I-post buffer and the MPEG decoder are made continuous.

(2) I-Pre-Buffering

The net delay in video playback arises from the time required to fill the MPEG decoding buffer. Therefore, to solve this problem, all of the start bitstream segments are previously stored in a buffer called an I-pre-buffer. The video playback is first decoded from the bitstream segments that are already in this buffer and placed in parallel, and during this interval the MPEG decoder buffer is filled by the bit data from the CD-ROM. If these two buffers are switched synchronously, video decoding can be performed continuously. As for the volume of the bitstream to be recorded in the I-pre-buffer, it is necessary that the size conditions for the VBV buffer be satisfied, but in most cases, because the delay required to be covered by buffering is long, this is easily satisfied.

An I-pre-buffer control mechanism (not shown in the figure) accesses the non-real-time file, and it is required that the MPEG decoder know beforehand the track/sector to be actually accessed. When a new video segment is accessed, first the corresponding bitstream segment is read from the I-pre-buffer; then, when the buffer used for the MPEG decoder is filled to the operating level, the bitstream is switched to the output from the decoder buffer. Usually, the MPEG decoder must wait until the switching of the synchronized buffer is conducted. As for the video output, a 30 msec (in the case of NTSC video standards) decoding delay is present, but the reproduction is instantaneous, and this delay is practically negligible.

Figure 4:
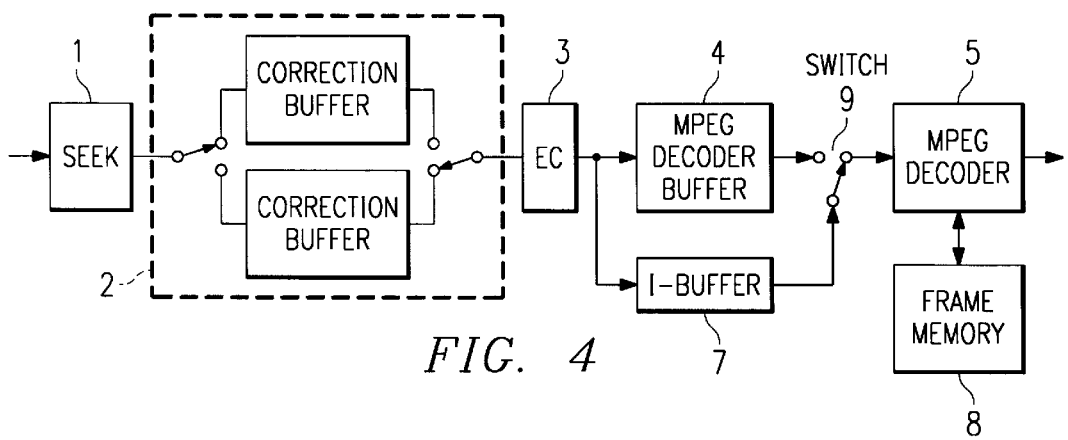
FIG. 4 is block diagram explaining a second embodiment of my invention.
Figure 5:
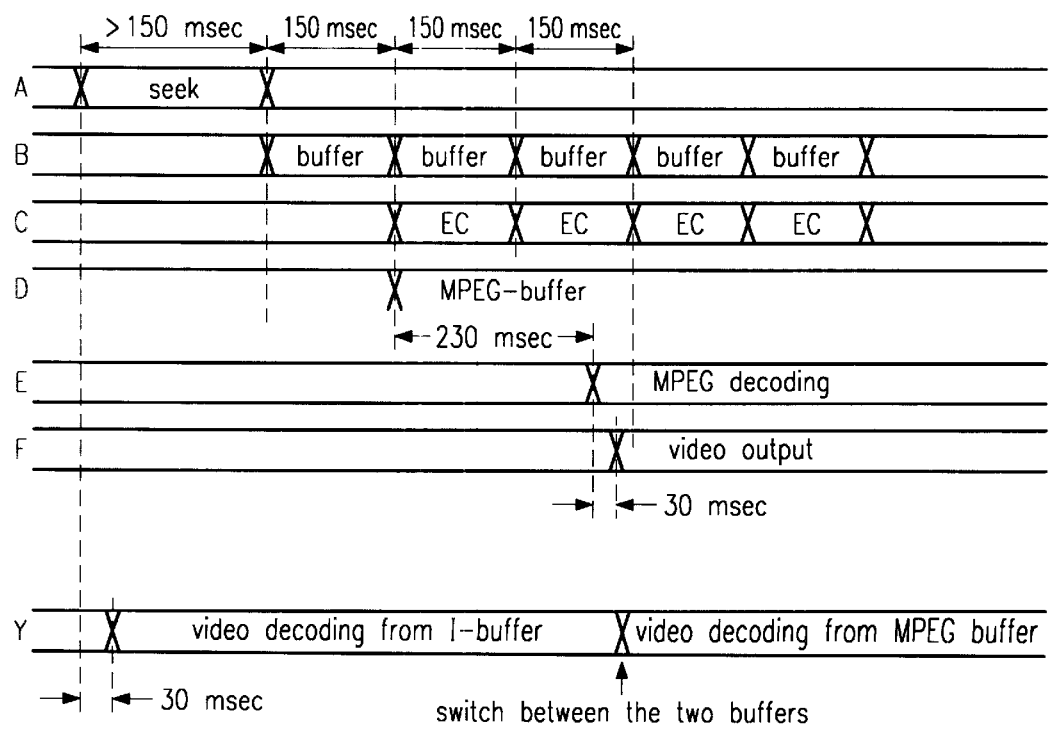
FIG. 5 is timing diagram explaining the embodiment of FIG. 4.

In the same manner as I-post-buffering, a video playback method using I-pre-buffering is explained using function block FIG. 4 and timing diagram FIG. 5. As was mentioned before, the video decoding delay can be sufficiently predicted. In I-pre-buffering, instead of the decoded bitstream, the input bitstream is stored in the pre-buffer located before the MPEG decoder. When the desired video is selected, the corresponding bitstream is instantaneously read from the I-pre-buffer (block 7, 9), and the video is reproduced 30 msec later, but the MPEG decoder buffer used for the MPEG decoder begins to be filled at the same time (block 4). The bitstream written into the buffer used for the MPEG decoder starts from a position slightly advanced relative to that stored in the I-pre-buffer.

Figure 7A:
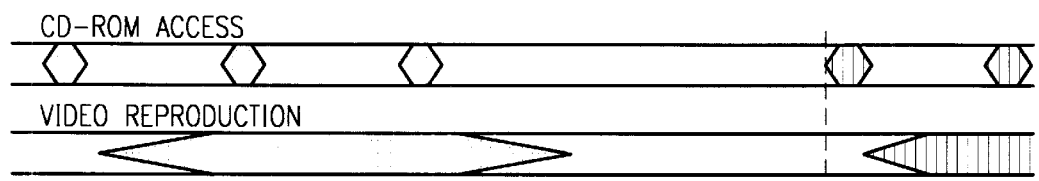
FIGS. 7A and 7B illustrate the method of filling the buffers in my invention.

As for the I-pre-buffer, it is clear that buffering can be done in the same manner as with I-post-buffering explained by FIGS. 6A and 6B. That the I-pre-buffer is effectively filled is further explained by using FIGS. 7A and 6B. According to this method, as is shown in FIG. 7A, by using a high speed CD-ROM drive device (the new drive device is four to six times faster), The I-pre-buffer can be filled simultaneously with the ongoing video reproduction. In this case, in I-pre-buffering, the buffer is padded most efficiently from the point of buffering time compared to I-post-buffering. Also, I-pre-buffering has a significant advantage from the standpoint of buffer data size because the compressed data can be buffered before the decoding.

The size of the I-buffer necessary in I-buffering varies as a function of the maximum number of selectable videos, the number of picture elements within the video stream, and the type of buffering (whether post-buffering or pre-buffering).

As an example, in a video delay of 660 to 1000 msec, 2 GOPs (30 MPEG frames) are sufficient to cover the decoding delay. This corresponds to $240 \times 352 \times 2 \times 30 = 5.069$ Mbytes in the I-post buffer, and 187.5 Kb in the I-pre-buffer. When eight video segments are stored in the I-buffer, the I-post buffer stores 40.5 Mbytes of video, but the I-pre-buffer stores only 1.5 Mbytes.

Figure 7B:
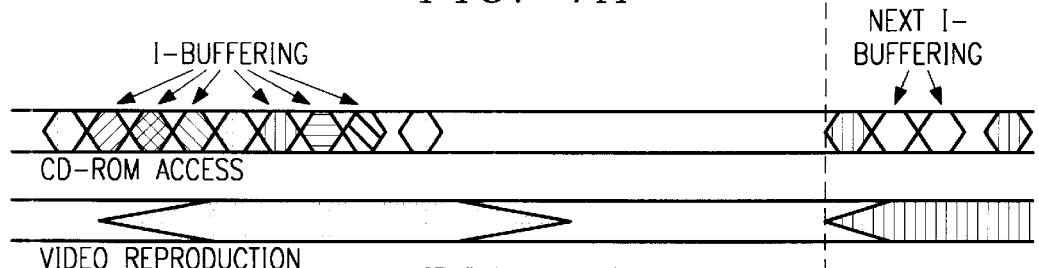
Figure 8:
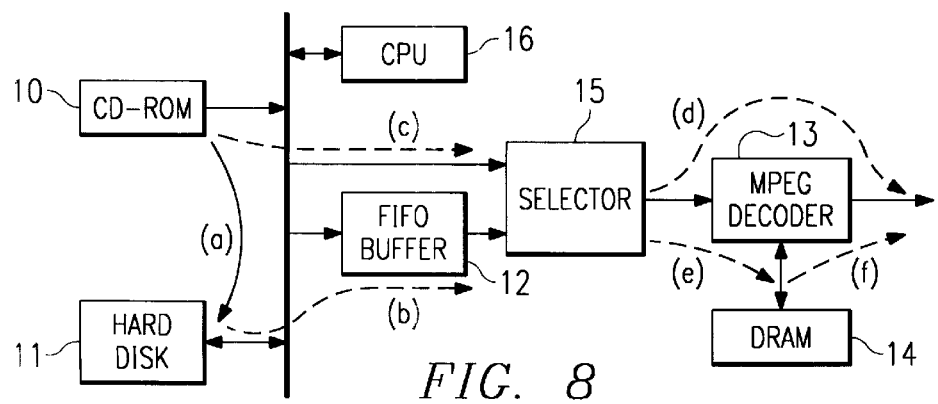
FIG. 8 is a block diagram of a system according to my invention.

From the standpoint of the time it takes to fill the I-buffer, in I-post-buffering 8 sections are required, and in I-pre-buffering, maximum use can be made of a high-speed drive device, for example, when using an 8X drive device, as shown in FIG. 7B, (simultaneously with the current video reproduction) only two seconds are required for filling the buffer. Because of the size of the buffer, the I-pre-buffer can be constructed on hard disk instead of in external memory. However, as is shown in FIG. 8, it is desirable that a small buffer be provided to interface between the hard disk and the MPEG decoder.

The operation of the I-pre-buffer on a hard disk will be explained with reference to FIG. 8. First, all of the next video segment is transferred to the hard disk 11 from the CD-ROM 10 as a bitstream (a). When a specific video reproduction is selected, the corresponding bitstream is read from the buffer on the hard disk 11, and transferred to the MPEG decoder 13 via the FIFO buffer 12. This bitstream is decoded by means of the MPEG decoder 13, and the video is instantaneously reproduced (d). At the same time, the succeeding bitstream is transferred from the CD-ROM 10 (c), and temporarily stored in the buffer (DRAM) 14 (e). When decoding buffer 14 is filled beyond the VBV buffer level and I-pre-buffer 11 is empty, the bitstream is read out from the decoding buffer 14 (f), and on the other hand, the decoding buffer 14 is continuously filled by means of the bitstream from the CD-ROM 10 (c, e). CPU 16 conducts the controls such as the selective reading of the bitstream from the decoding buffer 14. The switching of the flow of the bitstream is conducted by means of selector 15.

In conclusion, video compression is an important element in high-density video storage devices, and the mechanical track seek time, error correction, and MPEG decode buffering are three main causes of decoding delay; however, this problem can be solved by using either of the two aforementioned methods. My invention was explained above on the basis of embodiments, but it is not limited thereby. My method and system realize high quality interactive video access with short delay.

What is claimed is:

1. A video playback system comprising:
    a player for reading a plurality of segmented encoded compressed video bitstreams from a CD-ROM;
    a read/write disk drive that records a plurality of initial segments of the segmented encoded compressed video bitstreams from the player for a corresponding plurality of video sequences;
    a decoder responsive to a user selecting a specific video sequence, for retrieving and decoding from the disk drive a corresponding initial encoded compressed video bitstream corresponding to the selected video sequence's initial segment;

a decoding buffer for receiving and storing from the player a subsequent encoded compressed video bitstream corresponding to a video segment subsequent to the selected video sequence's initial segment; and a controller for activating the encoder to receive and decode from the decoding buffer the subsequent encoded compressed video bitstream.

2. A video playback method for deriving a video playback signal from a compressed bitstream video signal, comprising the steps of:

a. accessing a first portion of a plurality of video sequences from a video player source, b. storing a plurality of said plurality of first portion of video sequences in a buffer after accessing, c. outputting a video stream by first outputting one of said plurality of first portion of said plurality of video sequences, followed by a remaining portion of the same video sequence accessed from said video player source, wherein the access for the remaining portion is done during the outputting of said first portion.

3. The video playback method of claim 2 wherein the compressed bitstream video signal is an MPEG compressed bitstream video signal.

4. The video playback method of claim 2 wherein step a further comprises the steps of:

1) error correcting the first portion of compressed bitstream video signal into an error-corrected signal;

2) decoding the error-corrected signal by a decoder into a decoded error-corrected signal; and step b includes storing the decoded and error-corrected first portion into the buffer.

5. The method of claim 2 wherein the compressed bitstream video signal is an MPEG compressed bitstream video signal and the decoder is an MPEG decoder.

6. A video playback system for interactive use of a CD-ROM comprising:

a player for reading a plurality of segmented encoded compressed video bitstreams from a CD-ROM;

a read/write storage media that records a plurality of initial segments of the segmented encoded compressed video bitstreams from the player for a corresponding plurality of video sequences;

a decoder responsive to a user selecting a specific video sequence, for retrieving and decoding from the disk drive a corresponding initial encoded compressed video bitstream corresponding to the selected video sequence's initial segment, said decoder also for receiving and storing from the player a subsequent encoded compressed video bitstream corresponding to a video segment subsequent to the selected video sequence's initial segment.

7. The video playback system of claim 6 further comprising a buffer between said disk drive and said decoder.

* * * * *